United States Patent
Kronestedt et al.

(10) Patent No.: US 9,756,509 B2
(45) Date of Patent: Sep. 5, 2017

(54) DEFINING LOGICAL CELLS

(71) Applicant: Telefonaktiebolaget LM Ericsson (publ), Stockholm (SE)

(72) Inventors: Fredric Kronestedt, Bromma (SE); Magnus Lundevall, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 15/100,807

(22) PCT Filed: Dec. 17, 2013

(86) PCT No.: PCT/SE2013/051540
§ 371 (c)(1),
(2) Date: Jun. 1, 2016

(87) PCT Pub. No.: WO2015/094036
PCT Pub. Date: Jun. 25, 2015

(65) Prior Publication Data
US 2016/0295421 A1 Oct. 6, 2016

(51) Int. Cl.
*H04W 36/00* (2009.01)
*H04W 16/32* (2009.01)
(Continued)

(52) U.S. Cl.
CPC ........... *H04W 16/32* (2013.01); *H04W 24/02* (2013.01); *H04W 48/20* (2013.01)

(58) Field of Classification Search
CPC .................................................. H04W 36/00
(Continued)

(56) References Cited

U.S. PATENT DOCUMENTS 8,249,024 B2 * 8/2012 Ma .................... H04B 7/022
370/331
8,553,729 B2 * 10/2013 Zhang ..................... H04L 12/66
370/503
(Continued)

FOREIGN PATENT DOCUMENTS

WO 2013137792 A1 9/2013

OTHER PUBLICATIONS

Webb, M., Future Evolution in Wireless Network Architectures: Towards a "Cloud of Antennas", 2012 IEEE Vehicular Technology Conference (VTC Fall), Sep. 3, 2012, pp. 1-5, IEEE.
(Continued)

*Primary Examiner* — Temica M Beamer
(74) *Attorney, Agent, or Firm* — Coats & Bennett, PLLC

(57) ABSTRACT

It is disclosed a method and a network node (502, 70, 90) for selecting a candidate cell (14, 44, 06) to be combined with a target cell (12, 42, 502) having a radio equipment (76) connected to a radio equipment controller (74). The method comprises identifying (612, 82) at least two candidate cells where a time delay in communication between any two of: said at least two candidate cells and the target cell, is below a pre-determined time threshold, selecting (614, 84) the one (44) having the highest connection activity with the target cell; and combining (616, 86) the selected candidate cell (14, 44) and said target cell (12, 42) into a logical cell. Embodiments of the present invention have the advantage that the logical cells being defined provides have a high overall mobile network connectivity improvement.

15 Claims, 4 Drawing Sheets

(51) Int. Cl.
*H04W 24/02* (2009.01)
*H04W 48/20* (2009.01)

(58) Field of Classification Search
USPC .................................................. 455/436, 448
See application file for complete search history.

(56) References Cited

U.S. PATENT DOCUMENTS

2012/0208578 A1* 8/2012 Jeong .................. H04W 52/244
455/501
2015/0382255 A1* 12/2015 Dimou .............. H04W 36/0083
455/436

OTHER PUBLICATIONS

Georgakopoulos, A., et al., "Cognitive cloud-oriented wireless networks for the Future Internet", 2012 IEEE Wireless Communications and Networking Conference Workshops (WCNCW), Apr. 1, 2012, pp. 431-435, IEEE.

* cited by examiner

DEFINING LOGICAL CELLS

TECHNICAL FIELD

This disclosure relates to logical cells. In more particular, it relates to a method and a network node for defining a logical cell.

BACKGROUND

Deploying heterogeneous networks, where macro networks are complemented with small cells, is one way to improve capacity and coverage of the mobile network.

FIG. 1 illustrates a heterogeneous network comprising a macro cell 12, a small cell 14, a base station 16 of the macro cell 12, as well as a base station 18 of the small cell 14. Small cells are deployed where coverage and capacity of a macro network needs to be improved.

One way to deploy a heterogeneous network is to use a base station architecture based on remote radio equipment and radio equipment controllers. The remote radio equipment comprises radio frequency generation means and antenna elements whereas the radio equipment controller typically comprises baseband signal processing means. The remote radio equipment and radio equipment controller are typically interconnected by means of fibre carrying digital baseband signals, such as user plane information of in-phase and quadrature modulation data, so called IQ data.

This approach enables common baseband signal processing means to be used for macro and small cells. As a result, antennas at different macro and small cell sites can be configured to synchronously transmit a single logical cell identity and other common control information, together forming one logical cell or, differently worded, a combined cell.

FIG. 2 schematically illustrates a heterogeneous network comprising logical cell 22, a base station from the macro cell 24 and the base station 26 from the small cell in the combined logical cell. Wireless devices located within the logical cell are denoted by 28.

The removal of cell borders of small cells under the coverage of the macro cell has positive mobility effects, since it reduces handover signaling and handover interruption as well as the risk of other connection disturbances. In addition, inter-cell interference between small cells and a macro cell of a combined cell will no longer be a problem and can be managed more efficiently with common baseband processing means though interference mitigation features, such as, coordinated multipoint reception and transmission. Small cells are accordingly coordinated with the macro cell of the combined cell.

Using a logical cell hence requires that connected macro and small cells share baseband signal processing means. Examples of baseband signal processing means are baseband processing unit and radio equipment controller.

In practice, there is a limit on the number of radio equipment that can be connected to the one and the same radio equipment controller or a group of radio equipment controllers. The delay difference between any two cells forming one logical cell must be below a threshold time duration, in order not to risk that a synchronization requirement cannot be fulfilled. Noncompliance with this requirement causes interference within the logical cell.

Moreover, there can also be an upper limit within the radio equipment controller on how many cells can be grouped into one logical cell. This is due to hardware and/or software limitations, such as processing power, memory accessibility, interconnection interface speed within the logical cell, etc.

One problem is hence to determine which remote radio equipment to share the same radio equipment controller, being an example of baseband signal processing means, in order to create a single logical cell.

This task is not trivial and has no obvious solution.

There is hence a need for an inventive method for defining logical cells.

SUMMARY

It is an object of embodiments of the invention to address at least some of the issues outlined above, and this object and others are achieved by a method and a network node for defining a logical cell, according to the appended independent claims, and by the embodiments according to the dependent claims.

According to a first aspect, the invention provides a method for selecting a candidate cell to be combined with a target cell, wherein the target cell has radio equipment connected to a radio equipment controller. The method comprises identifying at least two candidate cells, where a synchronization time delay between any two of: the candidate cells and the target cell, is below a pre-determined time threshold. The method further comprises selecting the one of said at least two identified candidate cells, having the highest connection activity with the target cell. In addition, the method comprises combining the selected candidate cell and said target cell by connecting the radio equipment of the selected candidate cell to the radio equipment controller of the target cell.

According to a second aspect, the invention provides a network node adapted to select a candidate cell to be combined with a target cell, said target cell having radio equipment connected to a radio equipment controller. The network node comprises a processor, and a memory storing a computer program comprising computer program code which when run in the processor, causes the network node to identify at least two candidate cells each having a radio equipment showing a time delay relative to the radio equipment of the target cell in communicating with the radio equipment controller, wherein the time delay is below a pre-determined time threshold; and to select the one of said at least two identified candidate cells, having the highest connection activity with the target cell. In addition, the computer program code which when run in the processor, also causes the network node to combine the selected candidate cell and said target cell, by connecting the radio equipment of the selected candidate cell to the radio equipment controller of the target cell.

According to a third aspect, the invention provides a network node adapted to select a candidate cell to be combined with a target cell, wherein said target cell has radio equipment connected to a radio equipment controller. The network node comprises an identifying unit that is adapted to identify at least two candidate cells each having radio equipment showing a time delay relative to the radio equipment of the target cell in communicating with the radio equipment controller, wherein the time delay is below a pre-determined time threshold. The network node also comprises a selecting unit that is adapted to select the one of said at least two identified candidate cells, having the highest connection activity with the target cell. In addition, the network node comprises a combining unit that is adapted to combine the selected candidate cell and said target cell, by connecting the radio equipment of the selected candidate cell to the radio equipment controller of the target cell.

According to a fourth aspect, the invention provides a computer program. This computer program comprises computer program code which when run in a processor of a network node, causes the network node to identify at least two candidate cells where a time delay in communication between any two of: said at least two candidate cells and the target cell, is below a pre-determined time threshold, and to select the one of said at least two identified candidate cells, having the highest connection activity with the target cell. In addition, when the computer program code is run in a processor of a network node, it causes the network node to combine the selected candidate cell and said target cell, by connecting the radio equipment of the selected candidate cell to the radio equipment controller of the target cell.

It is an advantage with embodiments of the invention that the logical cells being defined will provide the highest overall mobile network connectivity improvement.

This improvement can be applied to areas having most connectivity problems or to areas for which the likelihood for network connectivity problems is relatively high.

Further advantages with embodiments of the invention will be mentioned below.

BRIEF DESCRIPTION OF THE DRAWINGS

Embodiments will now be described in more detail, and with reference to the accompanying drawings, in which.

DETAILED DESCRIPTION

In the following description, different embodiments of the invention will be described in more detail, with reference to accompanying drawings. For the purpose of explanation and not limitation, specific details are set forth, such as particular examples and techniques in order to provide a thorough understanding.

Embodiments of the present invention propose a method to identify and group remote radio equipment to form a logical cell. The method can be executed in a network node, for example an operation & maintenance (O&M) node, a base station, a radio network controller, a radio equipment controller.

An overall procedure on how to define a logical cell will be described down below.

Figure 1:
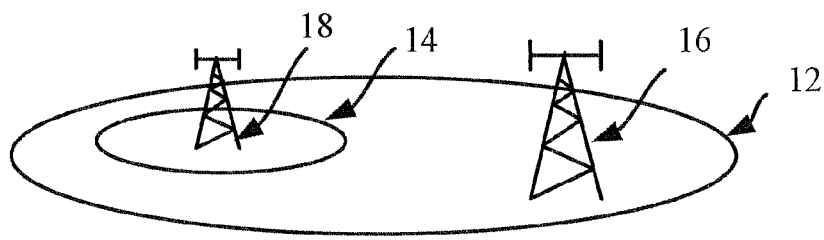
FIGS. 1 and 2 schematically illustrate heterogeneous networks of the prior art.
Figure 2:
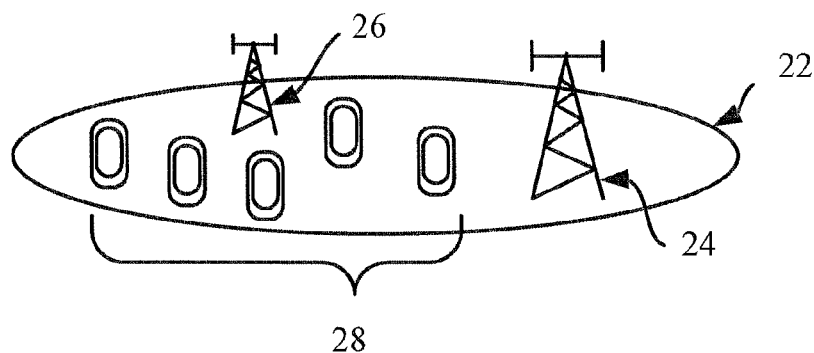
Figure 3:
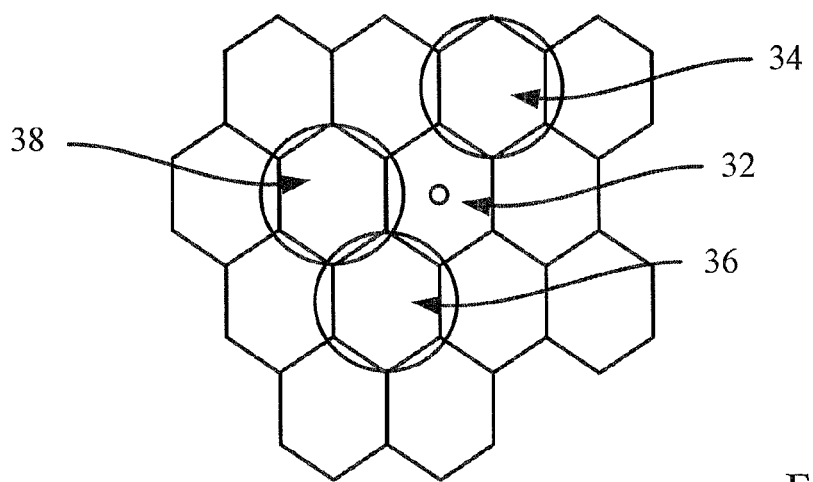
FIGS. 3 to 5 illustrate a cell plan of embodiments of the present invention.

FIG. 3 schematically presents a cell plan having a number of cells 32, 34, 36 and 38. Each cell is formed by individual remote radio equipment. The remote radio equipment of each cell typically comprises antenna elements and a radio frequency generator.

According to some embodiments of the invention, a procedure may comprise determining a first cell, based on which a logical, or combined, cell can be created. The determination of the first cell comprises collecting and analysing statistics about network connectivity for each cell in the area of concern. These areas of concern may comprise areas having most connectivity problems or areas in which the likelihood for network connectivity problems is relatively high.

In order to obtain statistics about network connectivity, said network connectivity may be collected, for example, over busy hours or over several days.

The first cell is identified as the cell in said area of concern having the highest network connectivity activity. Network connectivity activity may comprise one or more of: network connection failure rate, network connection success rate, absolute numbers of network connection failure and absolute numbers of network connection success. Moreover, evaluation of the network connectivity activity may also be based on a combination of indicators indicating network connectivity activity of remote radio equipment of each cell. These indicators may comprise:

handover success/failure rate,
radio link time out rate,
cell reselection/tracking area update rate,
dropped call/connection rate, and
successful call/connection rate.

Indicators comprising absolute numbers are also envisaged.

Having identified the first cell as the cell having the highest network connectivity activity within the area of concern, this cell is preferably used as a target cell.

In FIG. 3, the target cell, being marked with a small circle, is denoted by 32.

As was mentioned above, there is a synchronization delay requirement for cells within a logical cell. More precisely, there is a synchronization delay requirement of the radio equipment of each cell to be grouped together with a target cell into a logical cell. The synchronization delay between any two cells to be combined into a logical cell, has to be below a synchronization delay threshold. This is in order to avoid causing interference within the logical cell being created. Remote equipment of candidate cells fulfilling this synchronization delay requirement can hence therefore be connected to one and the same radio equipment controller.

Figure 4:
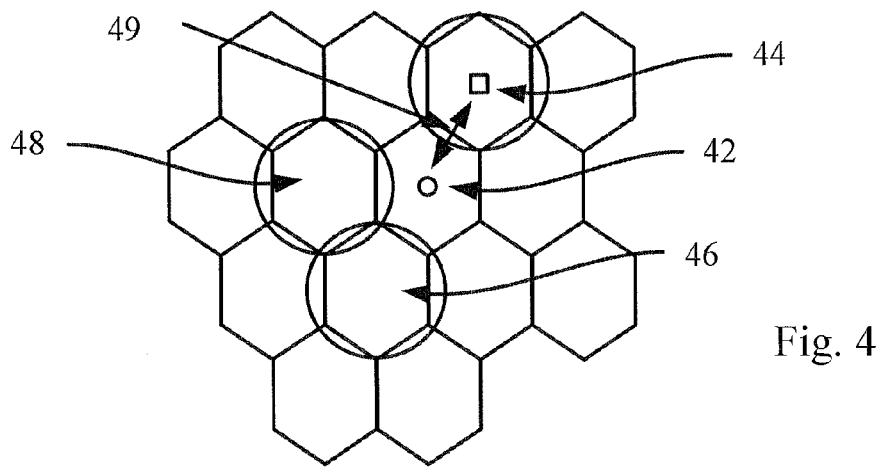

FIG. 4 illustrates a cell plan with a target cell 42, indicated with a circle. Based on an identified target cell 42, candidate cells within the neighbourhood of the target cell, are to be identified. These candidate cells have to fulfill the synchronization delay requirement to be connected to the same remote radio equipment controller as the target cell. FIG. 4 illustrate candidate cells 44, 46 and 48.

Among the candidate cells fulfilling the synchronization delay requirement, the candidate cell having the highest network connectivity activity involving the target cell, is identified. Examples of network connectivity activity may comprise network connectivity failure rate and/or success rate. Moreover, as briefly mentioned above, an evaluation of network connectivity may comprise evaluating indicators indicating network connectivity activity of remote radio equipment for each cell. These indicators are exemplified above.

The candidate cell having the highest network connectivity activity involving the target cell can thus be the candidate cell having a high number of dropped calls or other connectivity failures or successes, involving the target cell. In FIG. 4, this candidate cell having the highest network connectivity activity involving the target cell is denoted by 44, and is marked by a small square. The network connectivity activity between the candidate cell and the target cell is schematically illustrated in FIG. 4 and denoted by 49.

This identified candidate cell 44 is further selected to be combined with the target cell into a logical cell having the size of the target cell 42 in combination with the candidate cell 44.

The remote radio equipment of candidate cell 44 is thus connected to the same radio equipment controller as the radio equipment of the target cell 42.

In order to increase the logical cell, secondary cells within the neighbourhood of the formed logical cell, are evaluated as candidate cells for an even larger logical cell. Candidate cells of these secondary cells need to fulfill a synchronization delay requirement, to avoid interference in the logical cell. Remote radio equipment of each candidate cell must have a synchronization delay, relative to radio equipment already present in the logical cell, which fulfils the synchronization delay requirement. Since a candidate cell in principle is a secondary cell that fulfils the synchronization delay requirement, it can be argued that any candidate cell has a synchronization delay relative to the target cell and any other candidate cells, that fulfils the synchronization delay requirement.

It can be mentioned that any candidate cell already selected and included in the logical cell is excluded from candidate cells for further enlarging the logical cell.

Among all candidate cells, the cell having the highest network connectivity activity involving any cell in the logical cell may be selected and included in the logical cell to further increase the size of the logical cell.

The logical cell may be even further enlarged until an upper limit of the number of remote radio equipment feasible to be connected to one radio equipment controller or a group of interconnected radio equipment controllers, has been reached. Alternatively, the logical cell is enlarged until there are no more candidates having substantial network connectivity activity with any of the radio equipment of cells included in the logical cell.

It is mentioned that grouping of cells with a high number of connectivity success events involving radio equipment of the combined cell, is beneficial since signaling can be reduced when forming one logical cell. It is also of interest to secure communications in areas having a lot of users.

In the following a procedure similar to the one as described above will be discussed. For this procedure there is already a logical cell defined.

The procedure comprises identifying candidate cells in the same area as the logical cell, where the candidate cells fulfill synchronization delay requirements with the cells involved in the logical cell. These candidate cells can thus be connected to the same remote radio equipment controller as the logical cell.

Among the candidate cells the network connectivity activity between each candidate cell and any cell within the logical cell, is evaluated.

The candidate cell having the highest network connectivity activity involving the logical cell is selected. This network connectivity activity may comprise success and/or failure rates, or may alternatively be based on a combination of indicators, as exemplified above.

Having selected the candidate cell with the highest network connectivity activity, network connectivity activity of other cells within the logical cell is monitored. This may be performed by analysing statistics in the remote radio equipment of each cell within the logical cell; and determining how often specific remote radio equipment comprised within the logical cell is involved in communications. Other ways of determining network connectivity statistics are also possible.

If there is remote radio equipment of a cell within the logical cell having a lower network connectivity activity than the selected candidate cell as mentioned above, the logical cell can be updated by including the selected candidate cell and excluding the cell having the lower network connectivity activity.

By identifying another candidate cell having the highest network connectivity activity involving any cells in the logical cell, and comparing the network connectivity activity of cells already comprised in the logical cell, further cells may be excluded from the logical cell, when including selected candidate cells having high network connectivity activity.

By performing comparison of candidate cells outside the logical cell with cells already included in the logical cell, it is ensured that resulting cells in the logical cell will have a relatively high network connectivity activity. Defining logical cells based on cells having relatively high network connectivity activity is beneficial since signaling is reduced for cells within the logical cell.

In the case there is a candidate cell that is within the area of interest, for instance the neighbourhood, of two or more target cells, there may be a need to determine which target cell the candidate cell is to be combined with.

Figure 5:
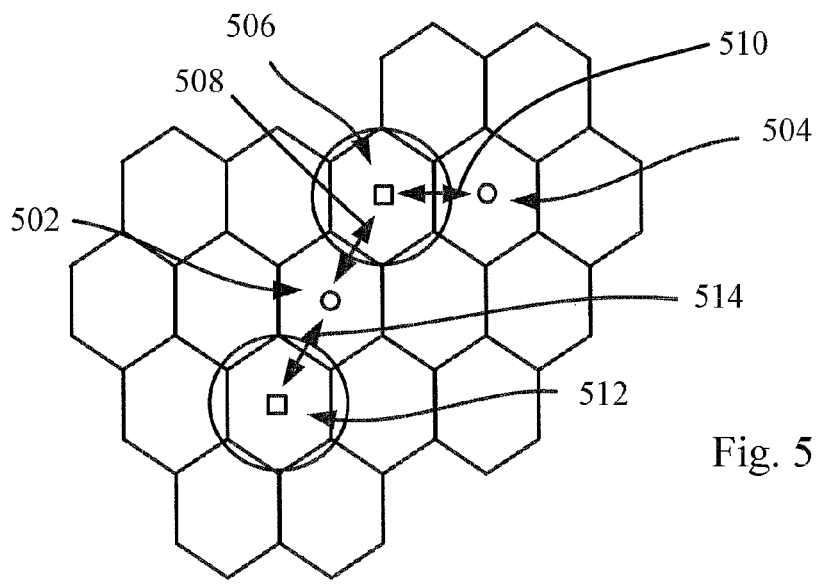

FIG. 5 illustrates a cell plan having a first target cell 502, a second target cell 504, as well as a first 506 and a second 512 candidate cell. The first candidate cell 506 is located in the neighbourhood of the first 502 as well as the second 504 target cell. Network connectivity activity between the first candidate cell 506 and the first target cell 502, on the one hand, is collected. However, network connectivity activity between the first candidate cell 506 and the second target cell 504, on the other hand, is also collected.

In this example, the first candidate cell 506 has the highest network connectivity activity with the first target cell 502 among the candidate cells for the target cell 502. The network connectivity activity 508 between the first target cell 502 and the first candidate cell 506 is thus higher than the network connectivity activity 514 between the second candidate cell 512 and the first target cell 502.

Moreover, it is further suggested that the first candidate cell 506 is the candidate cell that has the highest network connectivity activity 510 with the second target cell 502, of all other candidate cells for the second target cell 504.

Each selected candidate cell to be combined with a target cell to form a logical cell or to be included in a logical cell, can be regarded to be the cell that improves the network connectivity activity for the entire logical cell the most.

In this example, the target cell, being either the first target cell 502 or the second target cell 504, which gains the most by including the candidate cell 506 will have preference to said candidate cell for creating a logical cell.

Thus, in the case that two logical cells suggest to include the same candidate cell in its logical cell, the logical cell that gains the most by including the candidate cell has preference to the candidate cell.

Figure 6:
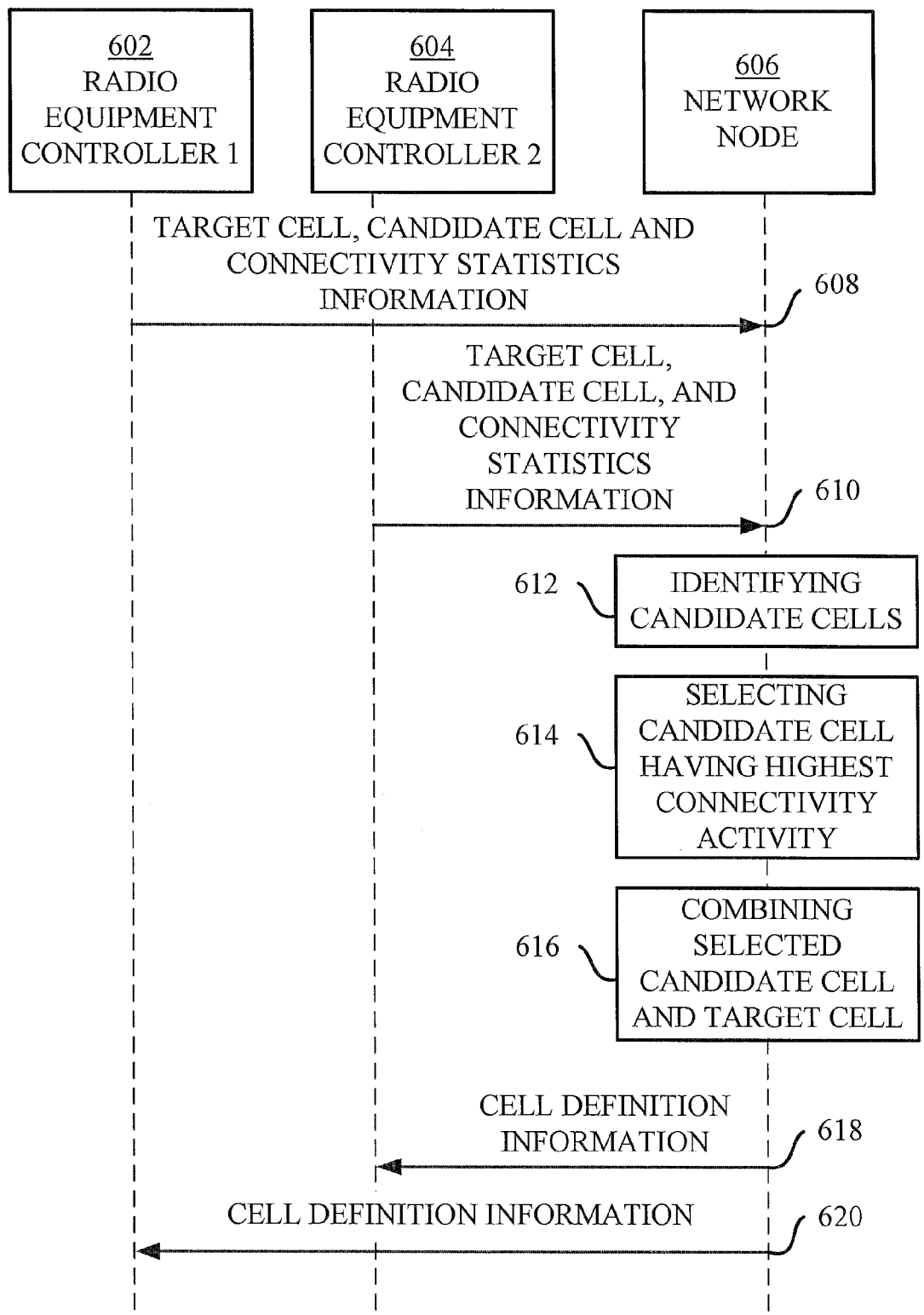
FIG. 6 illustrates a signaling diagram of embodiments of the invention.

FIG. 6 presents a signaling diagram of signaling between a radio equipment controller 1, 602, a radio equipment controller 2, 604 and a network node 606. According to some embodiments of the present invention this signaling diagram is applicable to scenarios in which two or more controllers provide network connectivity activity information to a network node in which a method for defining a logical cell is performed.

Accordingly, in 608, information about a first target cell, information about a first candidate cell and connectivity statistics information can be communicated from the radio equipment controller 1, 602, to the network node 606. In addition, in 610, information about a second target cell, information about a second candidate cell and connectivity statistics information is communicated from radio equipment controller 2, 604, to the network node 606.

Based on the information received in 608 and 610, the network node 606 may identify candidate cells in 612 for the first target cell and for the second target cell. In 614, candidate cells having the highest connectivity activity involving either the first or the second target cell, respectively, are selected.

In 616, each selected candidate cell is combined with the respective target cell, forming two logical cells.

In 618, cell definition information about the logical cell can be communicated to the radio equipment controller 2, 604, whereas in 620 cell definition information about the logical cell can be communicated to the radio equipment controller 1, 602 from one and the same network node 606.

Figure 7:
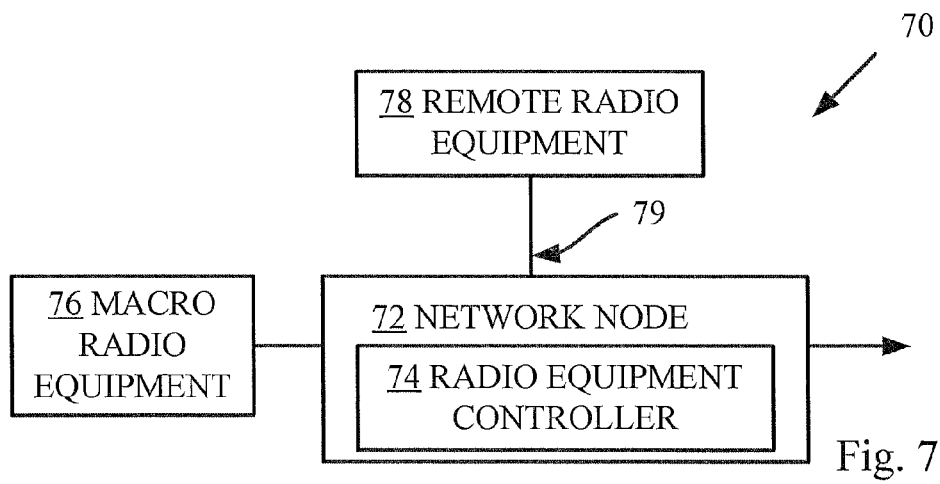
FIG. 7 schematically presents a network of embodiments of the invention.

FIG. 7 schematically presents a network 70 related to embodiments of the present invention. A network node 72 comprising a radio equipment controller 74, is connected to both a macro radio equipment 76 as well as to a remote radio equipment 78. The macro radio equipment 76 and the remote radio equipment 78 are connected to the network node 72 by means of fibre. By using a fibre between radio equipment 76, 78 and a radio equipment controller, the synchronization delay requirement may be fulfilled.

Figure 8:
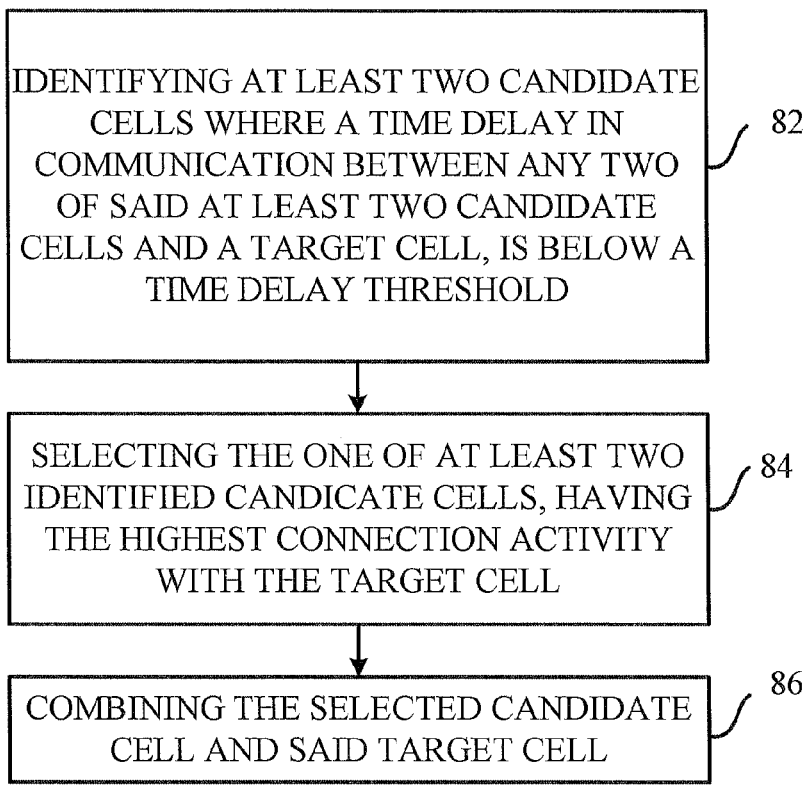
FIG. 8 presents method steps of embodiments of the invention.

FIG. 8 presents steps of a method for selecting a candidate cell to be combined with a target cell 12, 42, 502, where the target cell has radio equipment connected to a radio equipment controller.

In 82 the method comprises identifying at least two candidate cells, where a time delay in communication between any two of: the candidate cells and the target cell, is below a pre-determined time threshold.

In 84 the method comprises selecting the one of at least two identified candidate cells, having the highest connectivity activity with the target cell.

In 86, the method comprises combining the selected candidate cell and said target cell.

In 86, combining the selected candidate cell and said target cell may form a logical cell out of said selected cell and said target cell.

The target cell within the method may further be a logical cell.

The connection activity within the selecting the one of at least two identified candidate cells, having the highest connectivity activity with the target cell, may comprises one or more of: handover success or failure rate; radio link time out rate, cell reselection or tracking area update rate, dropped call/connection rate; and successful call/connection rate. As indicated above, absolute numbers may be used as an alternative to the exemplified rates, as further examples of network connectivity activity.

The method in a network node may further comprise obtaining target cell and candidate cell information, from a radio equipment controller of one or more target cells, and obtaining connection statistics information between candidate cells and said one or more target cells.

The method in a network node may further comprise, prior to combining the selected candidate cell 506 and said target cell 502, checking if the connection activity 508 between the selected candidate cell 506 and said target cell 502 is lower than a connection activity 510 between said selected candidate cell 506 and said another target cell 504, and if the connection activity 508 between the selected candidate cell 506 and the target cell 502 is lower than the connection activity 510 between said selected candidate cell 506 and said another target cell 504, deselecting said selected candidate cell 506, excluding said candidate cell from the identified candidate cells, and selecting the one 512 of said remaining identified candidate cells having the highest connection activity 514 with the target cell among the remaining identified candidate cells.

Figure 9:
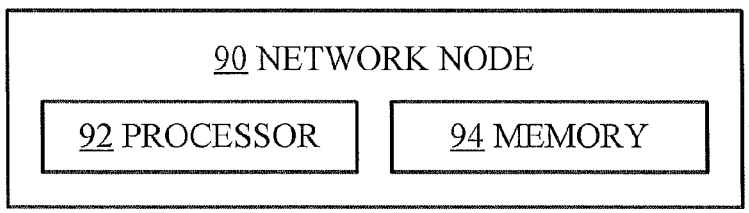
FIGS. 9 and 10 schematically illustrate a network node of embodiments of the invention.

In FIG. 9, a network node 90 is schematically illustrated. The network node comprises a processor 92 and a memory 94 storing a computer program comprising computer program code which when run in the processor 92, causes the network node 90 to:

identify 612, 82 at least two candidate cells (34, 36, 38, 44, 46, 48), where a time delay in communication between any two of: the at least two candidate cells and the target cell, is below a pre-determined time threshold;

select 614, 84 the one 44 of said at least two identified candidate cells, having the highest connection activity with the target cell; and combine 616, 86 the selected candidate cell 14, 44 and said target cell 12, 42 by connecting the radio equipment 78 of the selected candidate cell to the radio equipment controller 74 of the target cell 12, 42.

The computer program code when run in the processor, may cause the network node to form a logical cell out of the selected candidate cell 14, 44 and the target cell 12, 42, when connecting the radio equipment 78 of the selected candidate cell to the radio equipment controller 74 of the target cell 12, 42.

The target cell in the network node 90 may further be a logical cell.

The computer program code which when run in the processor, may also cause the network node to select the one of at least two identified candidate cells, having the highest connectivity activity with the target cell, comprising one or more of: handover success or failure rate; radio link time out rate, cell reselection or tracking area update rate, dropped call/connection rate; and successful call/connection rate. As mentioned above, network connectivity activity may comprise absolute numbers of each exemplified event, as an alternative to the rates.

The computer program code which when run in the processor, may also cause the network node to obtain target cell and candidate cell information, from a radio equipment controller of one or more target cells, and obtain connection statistics information between candidate cells and said one or more target cells.

The computer program code which when run in the processor, may also cause the network node to, prior to combining the selected candidate cell and said target cell, check if the connection activity between the selected candidate cell and said target cell is lower than a connection activity 510 between said selected candidate cell 506 and said another target cell 504, and if the connection activity 508 between the selected candidate cell 506 and the target cell 502 is lower than the connection activity 510 between said selected candidate cell 506 and said another target cell 504, deselect said selected candidate cell 506, excluding said candidate cell from the identified candidate cells, and select the one 512 of said remaining identified candidate cells having the highest connection activity 514 with the target cell among the remaining identified candidate cells.

Figure 10:
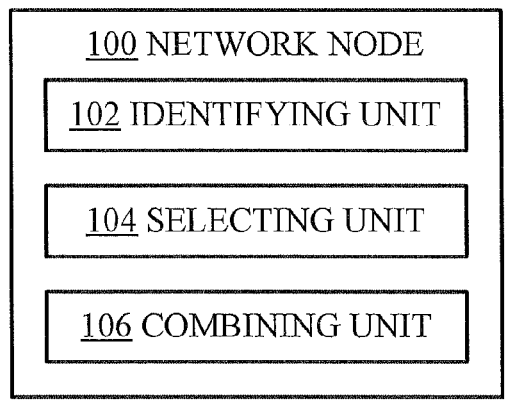

In FIG. 10, a network node 100 is schematically illustrated. The network node 100 comprises an identifying unit 102, a selecting unit 104 and a combining unit 106.

The identifying unit 102 is adapted to identify 612, 82 at least two candidate cells 34, 36, 38, 44, 46, 48, where a time delay in communication between any two of: the at least two candidate cells and the target cell, is below a pre-determined time threshold;

The selecting unit 104 is adapted to select 614, 84 the one 44 of said at least two identified candidate cells, having the highest connection activity with the target cell.

In addition, the combining unit 106 is adapted to combine 616, 86 the selected candidate cell 14, 44 and said target cell 12, 42 by connecting the radio equipment 78 of the selected candidate cell to the radio equipment controller 74 of the target cell 12, 42.

The combining unit 106 may further be adapted to form a logical cell out of said selected cell and said target cell, when connecting the radio equipment of the selected candidate cell to the radio equipment controller of the target cell.

As mentioned above the target node for the network node may be a logical cell 12, 22.

The connection activity may comprise rates and/or absolute numbers of one or more of: handover success or failure; radio link time out, cell reselection or tracking area update, dropped call/connection; and successful call/connection.

The network node may further comprise an information obtaining unit adapted to obtain target cell and candidate cell information from the radio equipment controller 602, 604, and connection statistics information between candidate cells 506 and one or more target cells 502, 504.

The selecting unit 104 of the network node may further be adapted to, prior to combining the selected candidate cell and said target cell, check if the connection activity 508 between the selected candidate cell 506 and said target cell 502 is lower than a connection activity 510 between said selected candidate cell 506 and said another target cell 504, and if the connection activity 508 between the selected candidate cell 506 and the target cell 502 is lower than the connection activity 510 between said selected candidate cell 506 and said another target cell 504, being adapted to deselect said selected candidate cell 506, excluding said candidate cell from the identified candidate cells, and to select the one 512 of said remaining identified candidate cells, having the highest connection activity 514 with the target cell 502 among the remaining identified candidate cells.

The network node may comprise an operations and maintenance node.

The network node may comprise a radio equipment controller 74, a radio network controller or a base station.

The present invention also provides a computer program comprising computer program code which when run in a processor 92 of a network node 90, causes the network node 90 to identify 82 at least two candidate cells where a time delay in communication between any two of: said at least two candidate cells and the target cell, is below a pre-determined time threshold. When the computer program code is run in a processor 92 of a network node 90, it causes the network node to select 84 the one of said at least two identified candidate cells, having the highest connection activity with the target cell. In addition, when the computer program code is run in a processor 92 of a network node 90, it causes the network node to combine 86 the selected candidate cell and said target cell, by connecting the radio equipment of the selected candidate cell to the radio equipment controller of the target cell.

The methods for selecting a candidate cell to be combined with a target cell, may be slow in the sense that they are executed to reflect changes of the radio network, i.e. when new remote radio equipment or cells are added in an area. If the time to group cells to the same radio equipment controller is small, e.g. if fibre switches and centralized radio access network (RAN) deployments are used, it could be executed more frequently. For example, the remote radio equipment forming a logical cell can change during one day to reflect different user behaviour during different times of a day. For instance, a behaviour during night time may be different from a behaviour during day time.

The method may be executed in a radio equipment controller and no communication between other radio equipment controllers are then needed.

If the method is executed in another node, for instance operations & maintenance (O&M) node, the radio equipment controller must send info about target and candidate cells together with connectivity statistics to the O&M node. The O&M node may then respond with candidate cells forming the logical cells to the radio equipment controller, which then forms the logical cell.

Embodiments of the present invention have the following advantages:

Within a given upper limit on the number of remote radio equipment that can be used for forming one logical cell, embodiments of the present invention define logical cells with the most improved network connectivity. These improvements can be applied to areas having most connectivity problems or to areas for which the likelihood for network connectivity problems is relatively high.

It is thus an advantage that the logical cells being defined will provide a high, if not the highest, overall mobile network connectivity improvement.

Grouping of cells with a high number of connectivity success events involving radio equipment of a logical cell, is beneficial since signaling can be reduced when forming one logical cell. It is also of interest to secure communications in areas with a lot of wireless devices of users.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

O&M Operations & Maintenance
RAN Radio Access Network
RF Radio Frequency
TCP Transmission Control Protocol

The invention claimed is:

1. A method in a network node for selecting a candidate cell to be combined with a target cell, said target cell having a radio equipment connected to a radio equipment controller, the method comprising:
   identifying at least two candidate cells, where a time delay in communication between any two of: said at least two candidate cells and the target cell, is below a pre-determined time threshold;
   selecting one of said at least two identified candidate cells, having the highest connection activity with the target cell; and
   combining the selected candidate cell and said target cell by connecting a radio equipment of the selected candidate cell to the radio equipment controller of the target cell.

2. The method in a network node, according to claim 1, wherein combining the selected candidate cell and the target cell, forms a logical cell out of said selected candidate cell and said target cell.

3. The method in a network node, according to claim 1, wherein the target cell is a logical cell.

4. The method in a network node according to claim 1, wherein the connection activity comprises rates and/or absolute numbers of one or more of: handover success or failure; radio link time out, cell reselection or tracking area update, dropped call/connection; and successful call/connection.

5. The method in a network node according to claim 1, further comprising obtaining target cell and candidate cell information, from a radio equipment controller of one or more target cells, and obtaining connection statistics information between candidate cells and said one or more target cells.

6. The method in a network node according to claim 5, wherein:
   prior to combining the selected candidate cell and said target cell, checking if the connection activity between the selected candidate cell and said target cell is lower than a connection activity between said selected candidate cell and said another target cell; and
   when the connection activity between the selected candidate cell and the target cell is lower than the connection activity between said selected candidate cell and said another target cell:
      deselecting said selected candidate cell, excluding said candidate cell from the identified candidate cells, and
      selecting one of said remaining identified candidate cells, having the highest connection activity with the target cell among the remaining identified candidate cells.

7. A network node configured to select a candidate cell to be combined with a target cell, said target cell having radio equipment connected to a radio equipment controller, the network node comprising:
   a processor; and
   a memory storing a computer program comprising computer program code which when run in the processor, causes the network node to:
      identify at least two candidate cells where a time delay in communication between any two of: said at least two candidate cells and the target cell, is below a pre-determined time threshold;
      select one of said at least two identified candidate cells, having the highest connection activity with the target cell; and
      combine the selected candidate cell and said target cell, by connecting a radio equipment of the selected candidate cell to the radio equipment controller of the target cell.

8. The network node according to claim 7, wherein the memory stores a computer program comprising computer program code which when run in the processor causes the network node to form a logical cell out of said selected candidate cell and said target cell, when connecting the radio equipment of the selected candidate cell to the radio equipment controller of the target cell.

9. The network node according to claim 7, wherein the target cell is a logical cell.

10. The network node according to claim 7, wherein the connection activity comprises rates and/or absolute numbers of one or more of: handover success or failure; radio link time out, cell reselection or tracking area update, dropped call/connection; and successful call/connection.

11. The network node according to claim 7, wherein the memory stores a computer program comprising computer program code which when run in the processor causes the network node to obtain target cell and candidate cell information from the radio equipment controller, and connection statistics information between candidate cells and one or more target cells.

12. The network node according to claim 7, wherein the memory stores a computer program comprising computer program code which when run in the processor causes the network node to:
   prior to combining the selected candidate cell and said target cell, check if the connection activity between the selected candidate cell and said target cell is lower than a connection activity between said selected candidate cell and said another target cell; and
   when the connection activity between the selected candidate cell and the target cell is lower than the connection activity between said selected candidate cell and said another target cell,
      deselect said selected candidate cell, excluding said candidate cell from the identified candidate cells, and
      select one of said remaining identified candidate cells, having the highest connection activity with the target cell among the remaining identified candidate cells.

13. The network node according to claim 7, wherein the network node comprises an Operations and Maintenance node.

14. The network node according to claim 7, wherein the network node comprises the radio equipment controller, a radio network controller, or a base station.

15. A computer program product stored on a non-transitory computer readable medium and comprising computer program code which when run in a processor of a network node, causes the network node to:
   identify at least two candidate cells where a time delay in communication between any two of: said at least two candidate cells and the target cell, is below a pre-determined time threshold;
   select one of said at least two identified candidate cells, having the highest connection activity with the target cell; and
   combine the selected candidate cell and said target cell, by connecting a radio equipment of the selected candidate cell to the radio equipment controller of the target cell.

* * * * *